United States Patent [19]

Kirby et al.

[11] E Re. 30,040

[45] Reissued Jul. 3, 1979

[54] VESSEL FOR FLOTATION LOADING AND UNLOADING AND PARTIAL BUOYANCY SUPPORT OF BARGES AND OTHER FLOATING CARGOES

[75] Inventors: William E. Kirby, Hong Kong; David J. Seymour, Daly City, Calif.

[73] Assignee: Wharton Shipping Corporation, Edificio Vallarino, Panama

[21] Appl. No.: 837,167

[22] Filed: Sep. 27, 1977

Related U.S. Patent Documents

Reissue of:

[64] Patent No.: 3,913,512
Issued: Oct. 21, 1975
Appl. No.: 511,492
Filed: Oct. 2, 1974

U.S. Applications:

[63] Continuation-in-part of Ser. No. 415,968, Nov. 8, 1973, abandoned.

[51] Int. Cl.[2] ..... B63B 35/28

[52] U.S. Cl. ..... 114/260; 114/72

[58] Field of Search ..... 114/72, 73, 77 R, 77 A, 114/56, 44–46, 258, 259, 260, 75, 27; 105/366 E, 366 B, 464, 486, 496; 214/12, 13

[56] References Cited

U.S. PATENT DOCUMENTS

| | | | |
|---|---|---|---|
| 1,107,741 | 8/1914 | Ballin et al. | 114/72 X |
| 1,533,776 | 4/1925 | Tiburtius | 114/260 |
| 1,803,104 | 4/1931 | Fletcher | 114/260 X |
| 3,186,369 | 6/1965 | McLennan et al. | 114/77 R X |
| 3,356,058 | 12/1967 | Lunde | 114/27 |
| 3,450,279 | 6/1969 | Yukawa | 114/258 X |
| 3,537,413 | 11/1970 | Farrell | 114/260 |
| 3,774,565 | 11/1973 | Paxos | 114/77 A X |
| 3,823,681 | 7/1974 | Cushing et al. | 114/260 |

FOREIGN PATENT DOCUMENTS

| | | | |
|---|---|---|---|
| 1186886 | 4/1970 | United Kingdom | 114/72 |

*Primary Examiner*—Trygve M. Blix
*Assistant Examiner*—Sherman D. Basinger
*Attorney, Agent, or Firm*—Owen, Wickersham & Erickson

[57] ABSTRACT

A vessel for transporting, on a body of water, cargo consisting of barges, pontoons, and lighters, and other floating cargoes. The hull has a bow, a stern, and watertight buoyancy compartments in side walls. The hull also has a perforate bottom shell with rigid supporting and reinforcing structure, enabling the cargo hold to be flooded and open to the sea under all conditions while loading, in transit, and during discharge. A hinged gate is provided at either or both ends of the hull for rapid flotation loading and unloading of the floating cargo, and each gate closed during transportation of the cargo. The vessel carries means for moving the cargo into, out of, and within the hold. A series of vertical pistons secure the floating cargo units by exerting a downward force to bring the cargo to bear on the hull structure. The water in the hold, having communication with the sea, provides buoyancy for the cargoes secured therein. This buoyancy supports most of the deadweight of floating cargoes, so that typically only a minor portion of the deadweight is carried by the vessel. In the case where the buoyancy of some cargo unit in the secured position exceeds its weight, such as in a lightly loaded barge, a transfer of buoyancy to the vessel assists the vessel in supporting the heavier floating cargo units. Thus such buoyancy and the transfer of buoyancy by floating cargo units to support the cargo's own weight reduces the load carried by the vessel, enabling a structural saving in its weight; this, together with rapid loading and unloading, provide a more efficient transportation system.

51 Claims, 29 Drawing Figures

DRAFT VS. TONS PER INCH IMMERSION

FIG _ 11
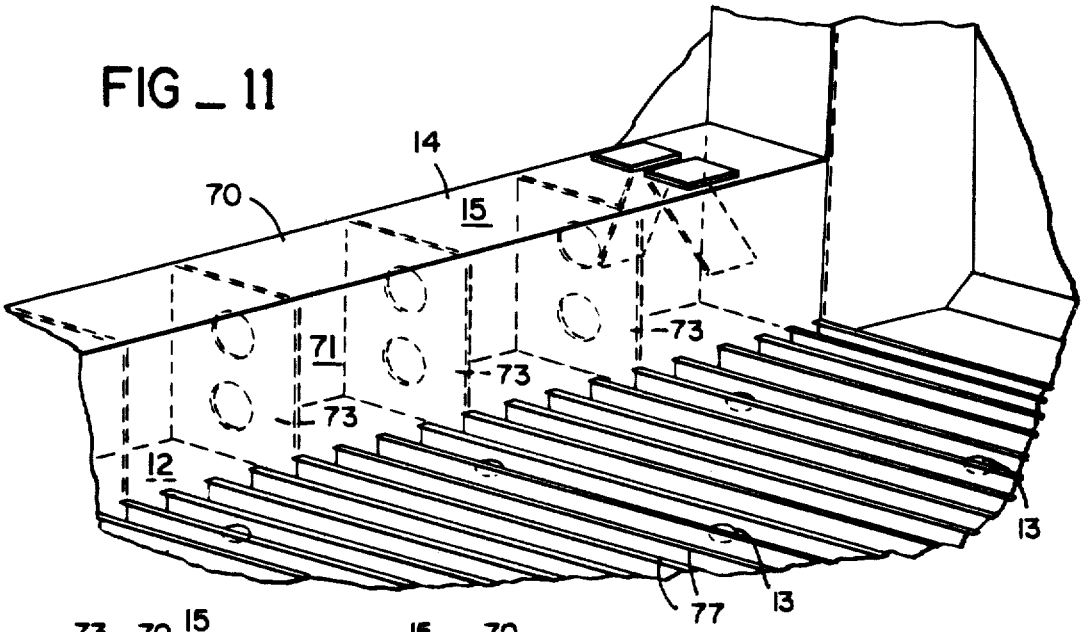
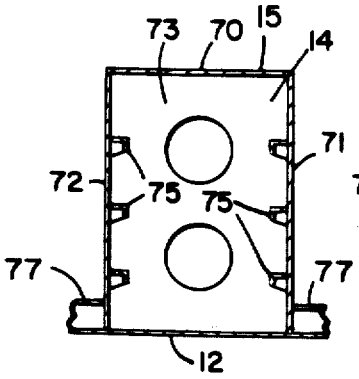
FIG _ 13
FIG _ 14
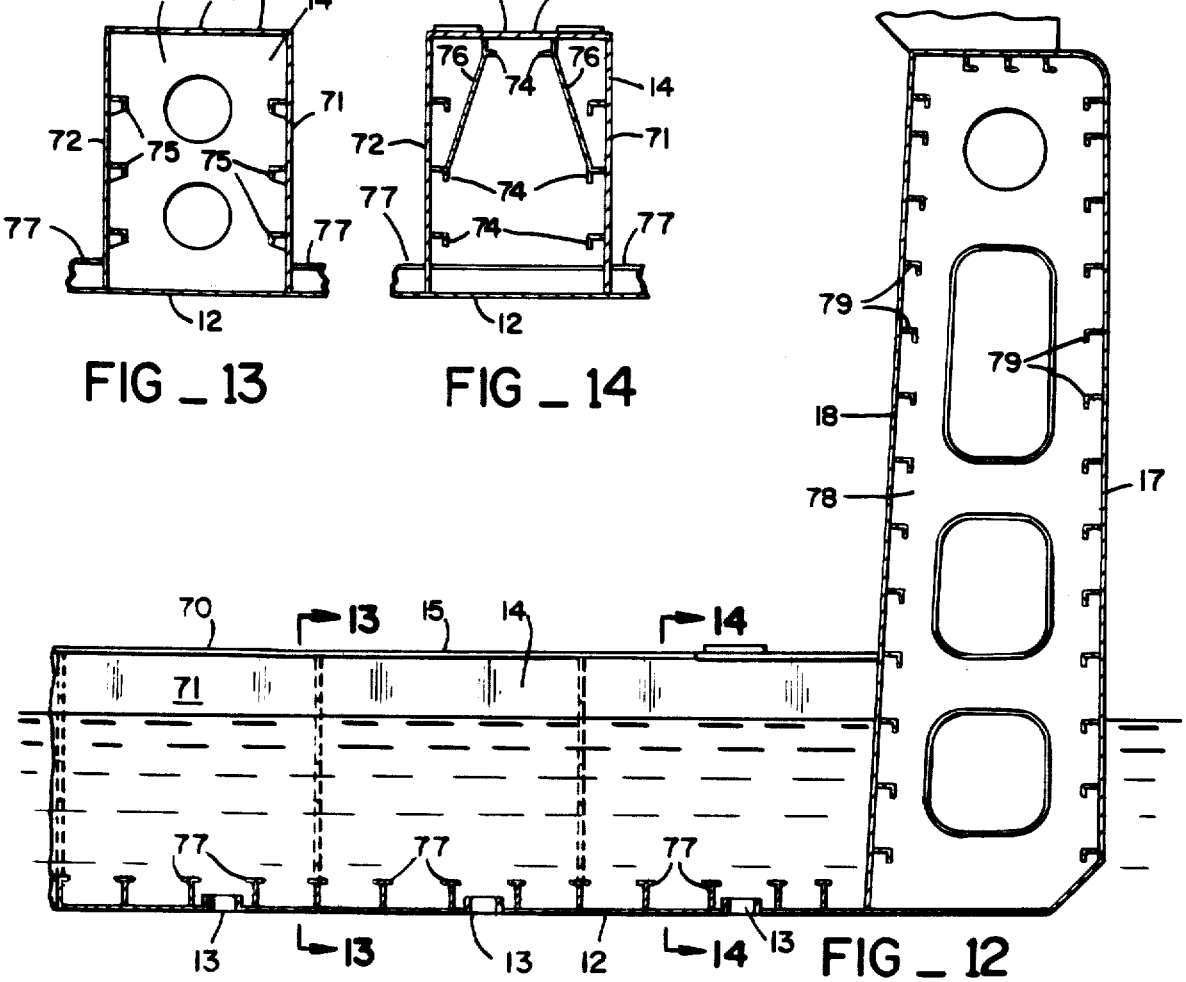
FIG _ 12

VESSEL FOR FLOTATION LOADING AND UNLOADING AND PARTIAL BUOYANCY SUPPORT OF BARGES AND OTHER FLOATING CARGOES

Matter enclosed in heavy brackets [ ] appears in the original patent but forms no part of this reissue specification; matter printed in italics indicates the additions made by reissue.

REFERENCE TO RELATED APPLICATION

This application is a continuation-in-part of application Ser. No. 413,968, filed Nov. 8, 1973 and now abandoned.

BACKGROUND OF THE INVENTION

This invention relates to vessels for transporting cargo, and it particularly relates to improvements in vessels in which the buoyancy of the cargo is utilized to support a substantial portion of its own weight, leaving the remaining, typically minor portion to be carried by the hull. In this vessel, the hull serves to contain the cargo securely and at the same time to provide a smooth external envelope of a desired form to minimize hydrodynamic resistance; at the same time, the hull enables employment of buoyancy of the cargo by always maintaining water within the hold common with the sea, by means of permanent openings in the bottom of the hull for free passage of water in and out. The vessels of this invention may have their floating cargo loaded and unloaded into the hold by cranes, but in many instances the vessels are preferably loaded and unloaded through a gate at either or both ends. The vessels may also carry deck cargoes which are supported by the buoyancy of the vessel and excess buoyancy of any floating cargo carried.

The invention is particularly helpful in transporting cargo of the type that is shipped in barges or floating containers. A series of these barges or containers is typically moved on water by a tugboat up to a location adjacent the bow or stern of the vessel; then the series of barges or containers is loaded in through a gate in the bow or the stern. After the voyage, the same series of containers is unloaded through a gate in the bow or stern and towed away by a tugboat.

Many patents disclose vessels wherein the cargocarrying hold of the vessel is partially filled with water but only during loading and unloading. Gates in the bow, in the stern or in the sides of the vessel have been used, and various types of cargoes have been floated in and floated out. In these vessels the practice has been to pump all the water out of the hold after the cargo has been loaded, keeping the water out until the cargo is to be unloaded so that the vessel carries the full deadweight of the cargo. In all these patents, the water inside the hold is used only for floating the cargo into and out from the hold, and water is never carried in the hold during the voyage.

In contrast, U.S. Pat. No. 3,356,058 to Thomas T. Lunde discloses and claims a vessel for transporting logs. In this log-transporting vessel of Lunde, there are a ballast system and ports through the hull to achieve a flotation of part of the logs during the transport.

The present invention has the important advantage over the Lunde device that it can be used for transporting barges or containerized cargo of the type in which the containers can be floated in the water, whereas the Lunde vessel cannot.

There exist well-known systems in which barges or lighters are handled on a large high-speed, ocean-going vessel. One such system calls for towing the barges or lighters out to the vessel where they are floated over a submerged elevator which then lifts the barge [of] *or* lighter out of the water to a deck level where the barge or lighter is transferred over rollers to a final stowage position. Another such system tows the lighters or barges out to the vessel where they are hoisted aboard by large cranes on board the vessel. These systems both are used so that large vessels need not be delayed in port by having to handle cargoes at a pier. They can also transport cargoes to and from small ports that otherwise could not accommodate ocean-going vessels. In many instances, this system of loading and unloading is more economical than other marine transport systems.

In seeking to accommodate such barges or lighters on vessels generally of the type of the Lunde vessel, there are problems that are not encountered in transporting logs. Logs have substantially identical specific gravities, even though they are different shapes and sizes. The cargo containers that comprise the lighters and barges are normally identical in size and shape but, due to different degrees of loading, the containers vary considerably in their specific gravities. To load them into a ship and then allow them to float freely would not be feasible. They would float at different levels, would tend to bob around, and could, under disturbed weather conditions, exert forces that could severely damage their hulls as well as the vessel's hull and might even cause the vessel to sink. Thus, there are difficult problems in making it possible to employ the buoyancy of empty or lightly filled lighters to help share the load of the heavily filled lighters with the hull. It cannot be done with the device shown in the Lunde patent. Yet, the solution of the problems gives rise to very beneficial results.

Problems relative to the loading and maintenance of the barges or lighters, as well as of other floating cargo, and problems relative to the specific situation described are also encountered.

SUMMARY OF THE INVENTION

The present invention shares in common with U.S. Pat. No. 3,356,058 to Lunde the employment of buoyancy forces through the use of a perforate hull and side walls of the vessel. However, the present invention calls for securing means which hold floating containerized cargo units, such as barges or lighters, in a positively fixed position during transport, so that the bottoms of all of the units are in firm engagement with the hull, and holding devices secured to the frame of the vessel and spaced above the hull extend down from the deck level to engage the tops of the units. Since individual barges or lighters usually have different densities, depending upon their degree of loading and on the specific gravities of their loads, those which are substantially empty or are lightly loaded, provide a considerable amount of excess buoyancy. In the present invention this excess buoyancy is transferred through the securing devices so as to enable the excess buoyancy effect to assist in supporting of the entire vessel and its floating cargo. Thereby, it becomes possible and practical to employ a lighter weight design of hull construction and to transfer floating cargoes, barges or lighters, through one end of the vessel directly from the ocean or other body of water common to both the barges or lighters and the vessel.

Barges and lighters may be loaded by floating them in. In one form of the invention, the barges and lighters may normally be floated in through a gate in the bow and discharged by floating them out through a second gate in the stern, thus greatly facilitating partial discharge operations in port. This is a first-in, first-out system.

A simple winching system of great versatility is provided for aiding the loading and unloading of the floating containers in, out, within and through the vessel.

Preferably, the securing devices mentioned above for barges or lighters include a hydraulic or pneumatic system which also has a mechanical safety lock when in final stowed position.

Other objects and advantages of the invention will appear from the following description of a preferred form of the invention.

BRIEF DESCRIPTION OF THE DRAWINGS

In the drawings:

FIG. 11 is a fragmentary view in perspective of a portion of the vessel near the bottom of the hull, showing one of the transverse box beams or girders.

FIG. 12 is a fragmentary view in section of a portion of the hull.

FIG. 13 is a view in section taken along the line 13—13 in FIG. 12.

FIG. 14 is a view in section taken along the line 14—14 in FIG. 12.

DETAILED DESCRIPTION OF A PREFERRED EMBODIMENT

Figure 4:
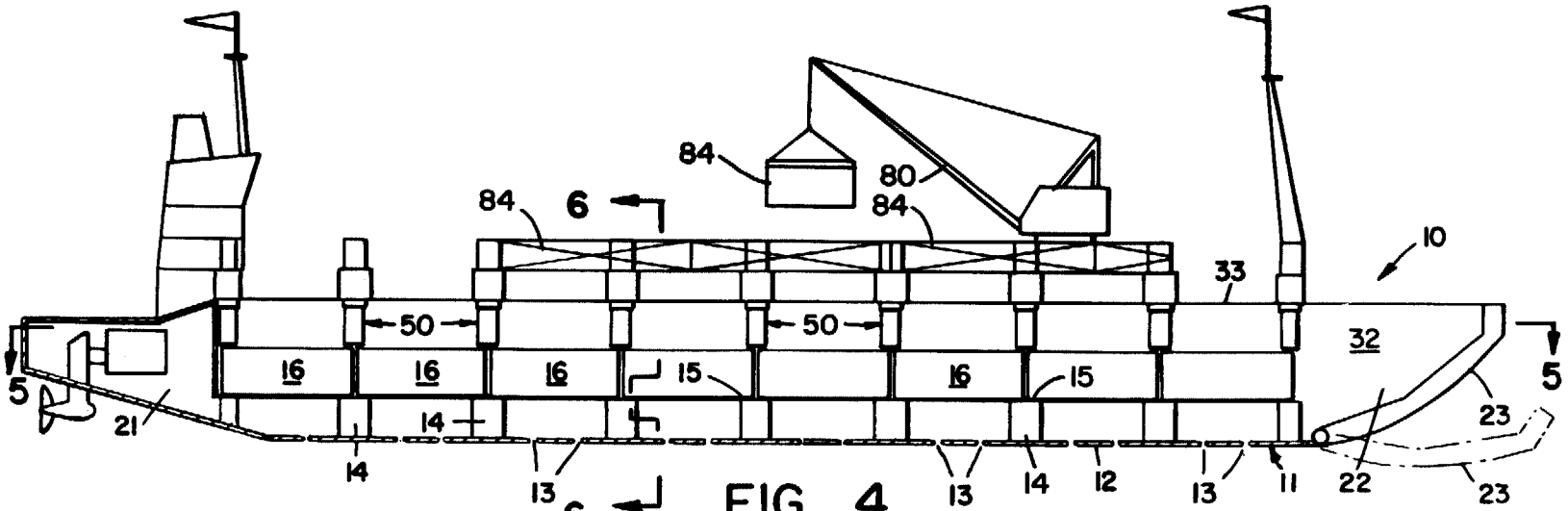
FIG. 4 is a view in side elevation and in section, somewhat schematic in character, of a vessel embodying the principles of the invention with the barges or lighters loaded and stabilized with the securing devices as well as with deck cargo stowage. The bow gate is shown in solid lines in its closed position and also is shown, in broken lines, in its open position.
Figure 5:
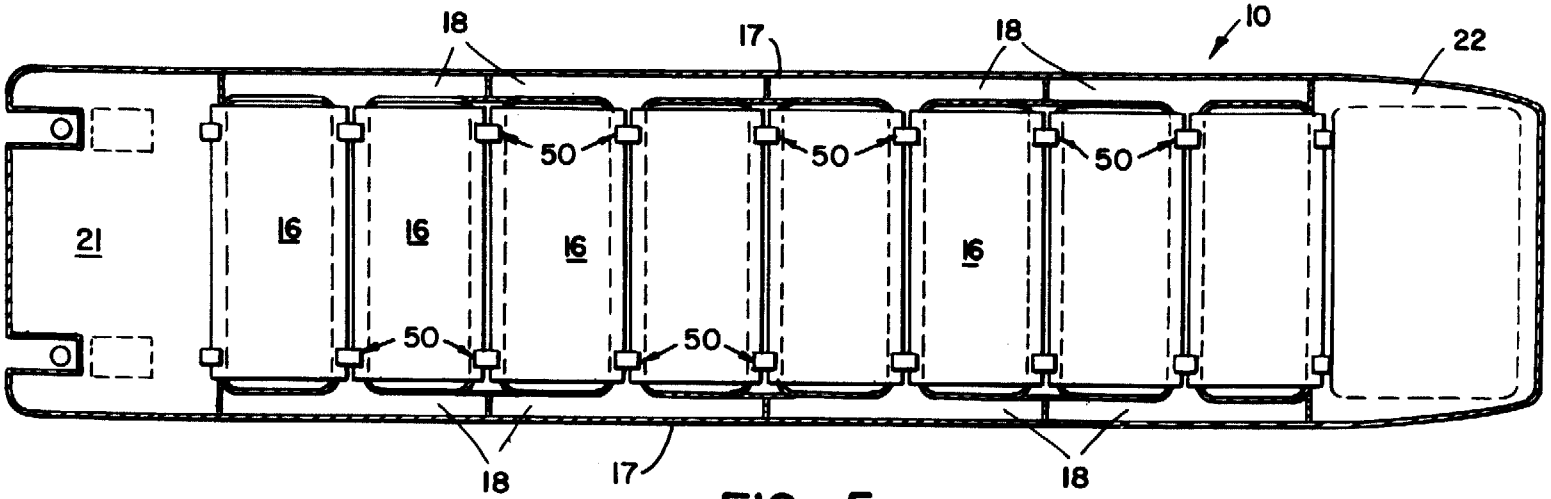
FIG. 5 is a plan view in horizontal section taken along the line 5—5 of FIG. 4, showing the barges or lighters in their stowed position for transport within the vessel.
Figure 6:
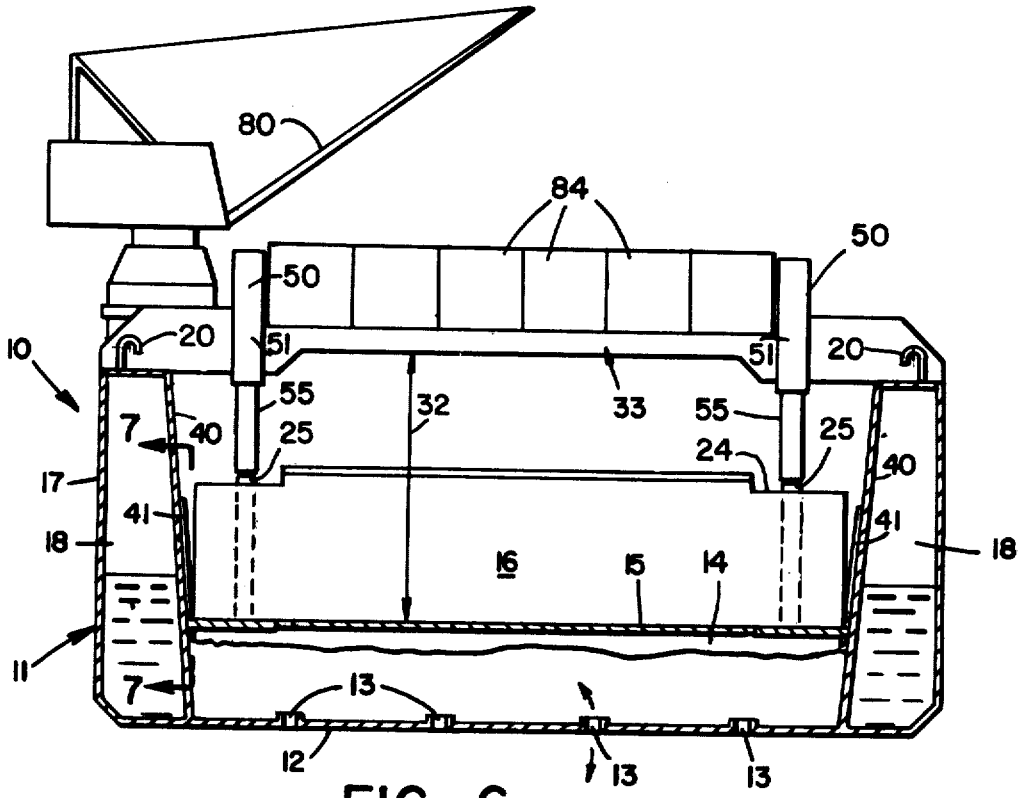
FIG. 6 is an enlarged view in cross section taken along the line 6—6 in FIG. 4 showing the lighters held in stabilized position by means of securing devices.
Figure 7:
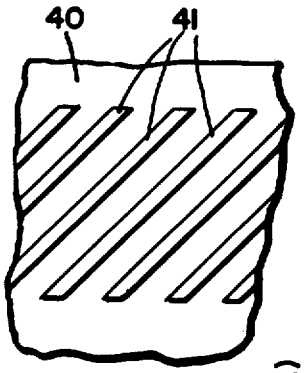
FIG. 7 is a fragmentary view in elevation taken along the line 7—7 in FIG. 6.

In a vessel 10 such as that shown in the drawings, the ship 10 is provided with a suitable hull 11 having a perforate bottom sheel 12 with inlet openings 13 that at all times are open to the body of water in which the vessel 10 floats (See FIGS. 4 and 6). The shell 12 can be thin, for the water exerts equal pressures on both surfaces thereof. The hull 11 is preferably strengthened by bottom transverse box girders 14 to take a suitable load *and provide a rigid submarine cargo-supporting and hull-reinforcing structure*, the hull and girders being shaped so that there will be a flat surface 15 for a series of identical floatable containers 16, such as lighters or barges. The vessel 10 can also be used for transporting other buoyant cargoes.

Figure 18:
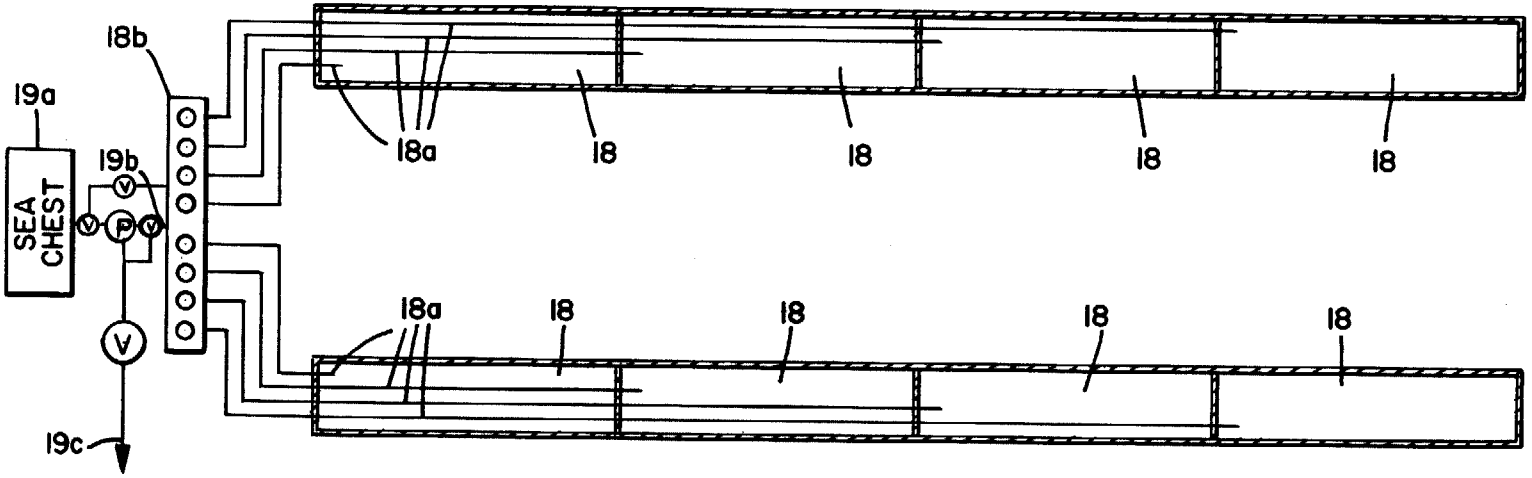
FIG. 18 is a diagrammatic plan view of the buoyancy tanks and pumping system.

The side walls 17 of most of the hull 11 comprise a series of watertight buoyancy tanks or compartments 18, each of which is provided with ballast piping 18a (See FIG. 18), connected to a ballast manifold 18b. The manifold 18b is connected to a suitable ballast pump 19 for transfer of sea water into the buoyancy tanks 18 from a sea chest 19a and for transfer of water out from the buoyancy tanks 18 into the sea via pipes 19b and 19c, suitable valves being provided for control. Air vents 20 are provided on top of the buoyancy tanks 18 to vent air in and out to the atmosphere as the tanks are filled or emptied. The waterline of the vessel 10 is determined by the weight of the cargo, the weight of the vessel 10, and the weight of the water in the buoyancy tanks 18, as supported by the buoyancy of the vessel 10 and the buoyancy provided by the barges and lighters 16. To control the draft of the vessel 10, the buoyancy tanks 18 can be filled to any desired degree to give any desired buoyancy or draft to the vessel as a whole and in combination with its barges or lighters. List and trim are controlled in the same way, by selective fill of certain tanks 18.

At the aft end of the vessel 10 is a vessel propulsion portion 21, which may be constructed substantially as is satisfactory in any such vessel, and there may be suitable and necessary crew accommodations, etc.

A suitable gate for flotation loading and unloading is provided at either or both ends of the vessel 10.

At the bow 22 of the vessel 10 of FIGS. 1–4 is a gate 23 which may, as shown in FIG. 4, normally extend above the waterline and may be swung down about a pivot that is at all times below the waterline, to enable the handling by flotation, of a series of containers 16 through it. The gate 23 is closed during the forward progress of the vessel 10 while enroute on the voyage.

Figure 15:
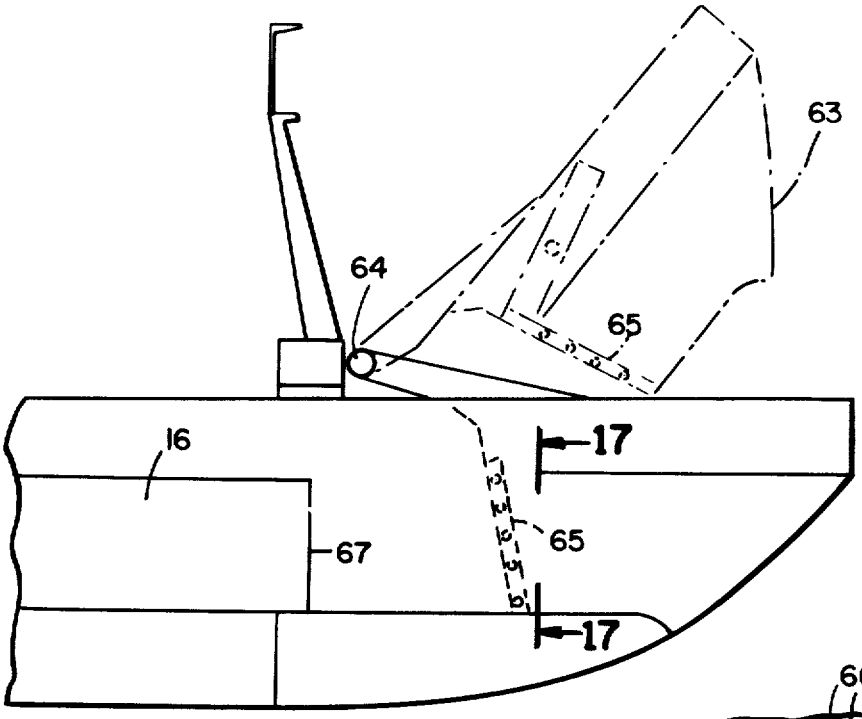
FIG. 15 is a fragmentary view of a forward portion of the vessel showing a modified form of bow gate. The gate is shown in broken lines in its open position.
Figure 17:
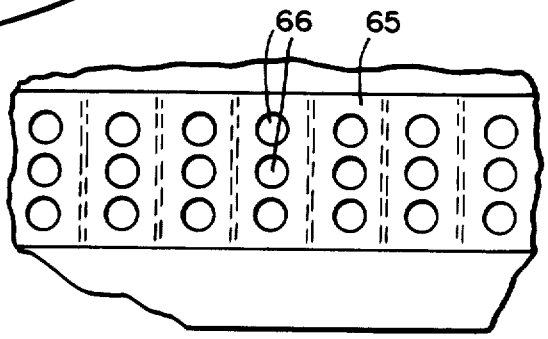
FIG. 17 is a view in elevation taken along the line 17—17 in FIG. 15, showing a swash bulkhead.
Figure 16:
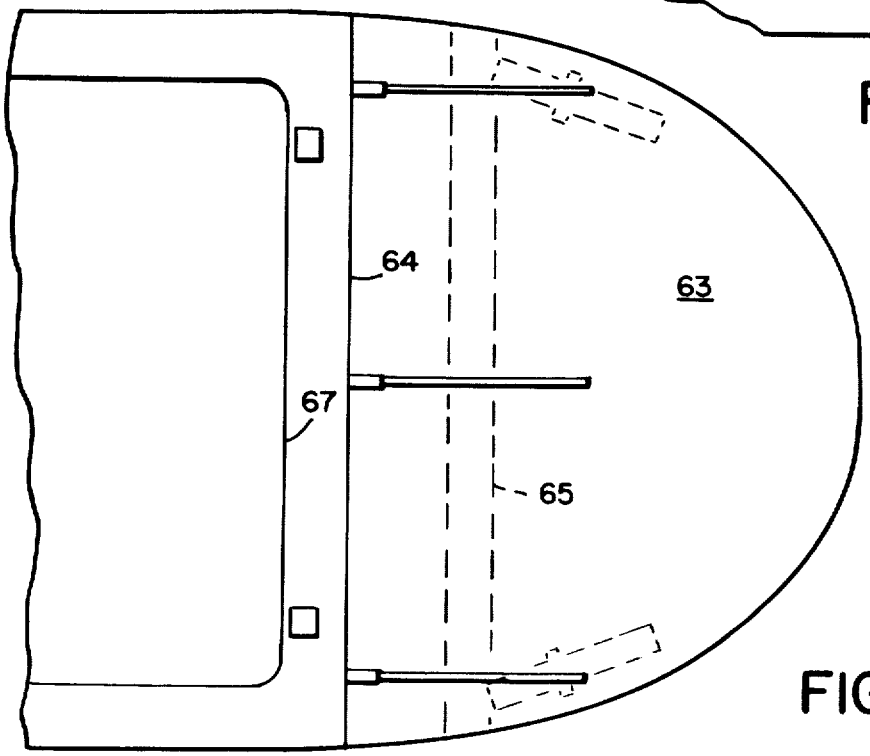
FIG. 16 is a plan view of the region of FIG. 15.

A modified form of bow gate 63 is shown in FIGS. 15 to 17. This bow gate 63 opens upwardly about pivots 64 and includes, spaced from the actual gate, a swash bulkhead 65, which is a generally vertical plate with openings 66 therethrough for preventing water from sloshing back and forth for the full distance between the bow gate 63 and the front edge 67 of the first container 16.

Figure 22:
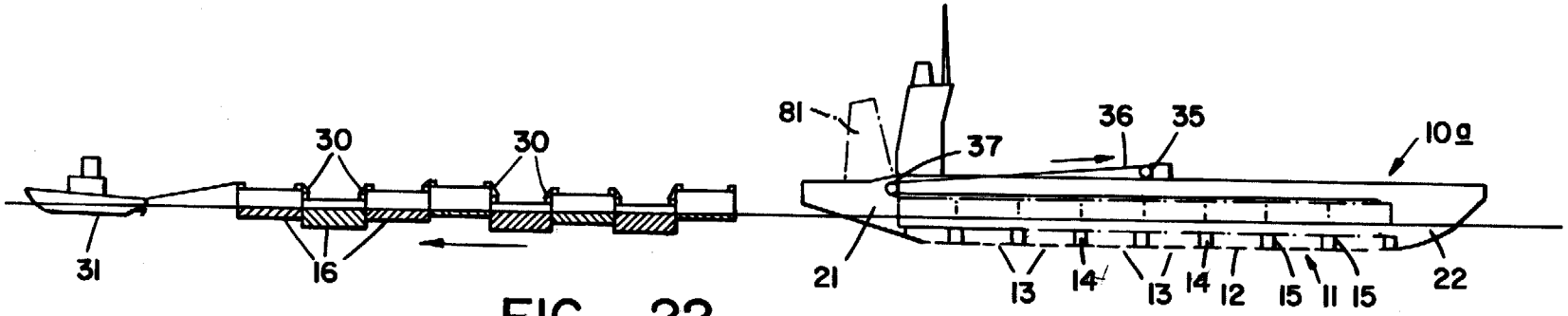
FIG. 22 is a view similar to FIG. 3 except that the unloading is proceeding through a stern gate instead of a bow gate.
Figure 23:
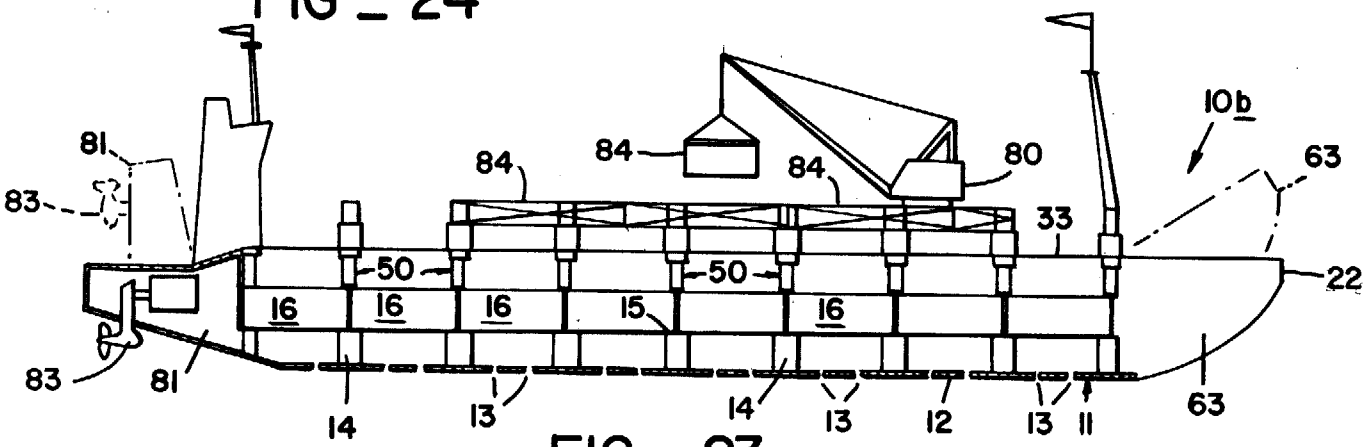
FIG. 23 is a view similar to FIG. 4 of a vessel embodying the principles of the invention and having both a bow gate and a stern gate, both opening upwardly.
Figure 25:
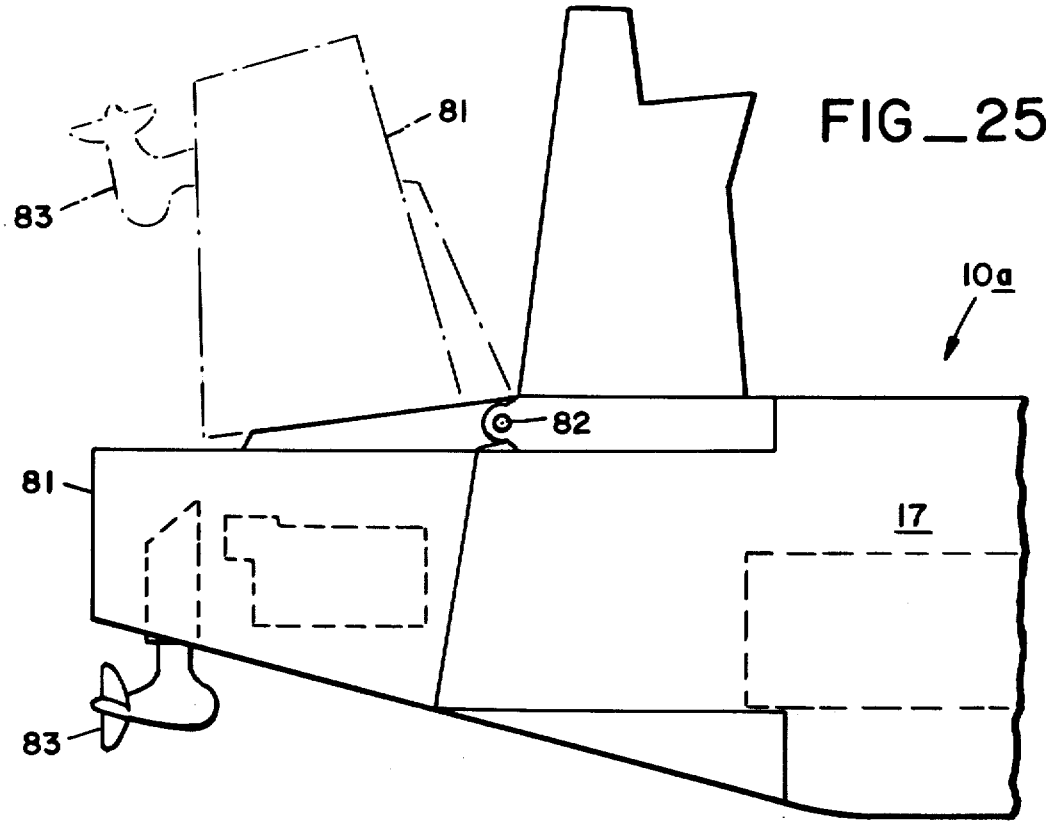
FIG. 25 is a fragmentary view of an aft portion of a vessel like that of FIG. 23 or FIG. 24 showing a stern gate. Its closed position is shown in solid lines, and its open position is shown in broken lines.
Figure 26:
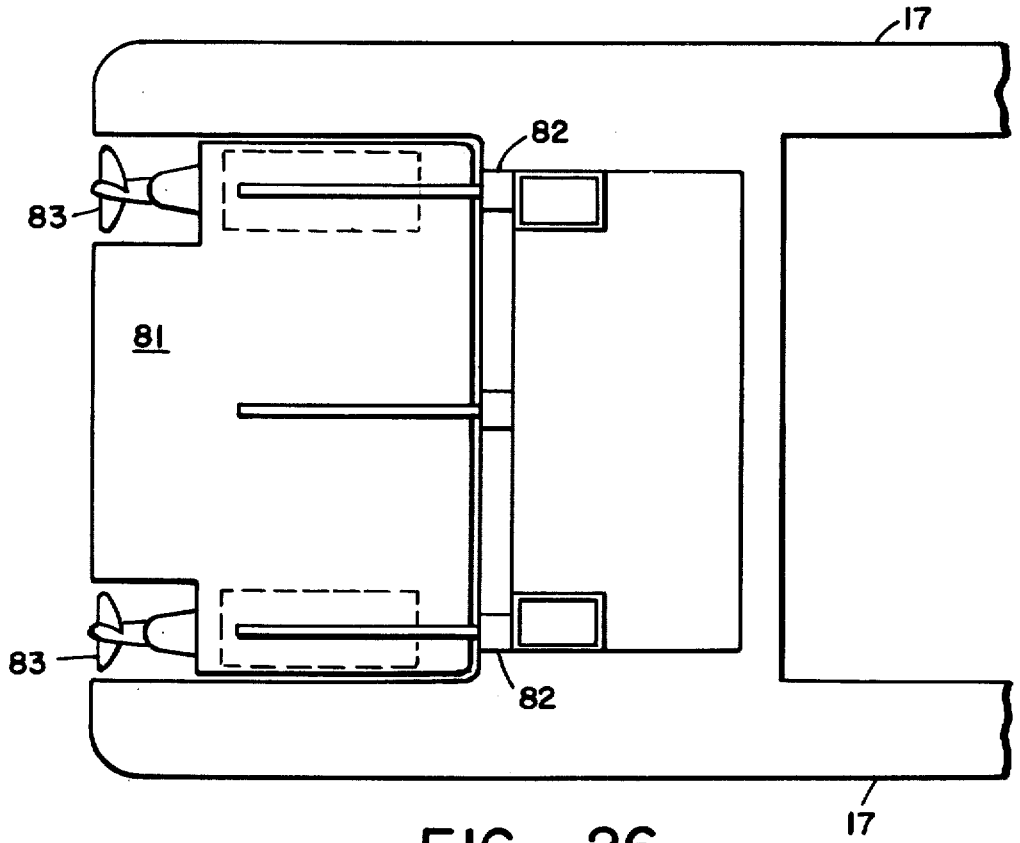
FIG. 26 is a plan view of the region of FIG. 25.

As FIG. 22 shows, a vessel 10a embodying this invention may have a stern gate 81, preferably opening upwardly for loading and unloading operations. Moreover, as FIG. 23 shows, a vessel 10b, also embodying the invention may have both a bow gate 63 and a stern gate 81. FIGS. 25–26 show the stern gate 81 in more detail. The gate 81 moves up around pivots 82 and may carry with it one or more propulsion thrusters 83. The stern gate 81, when used, is closed when the vessel 10a or 10b is transporting its cargo, being raised only for loading or unloading.

When a vessel 10b is used having both a bow gate 63 and a stern gate 81, one gate may be used for loading and the other for unloading, thereby achieving a first-in, first-out operation of floating cargo units.

Figure 1:
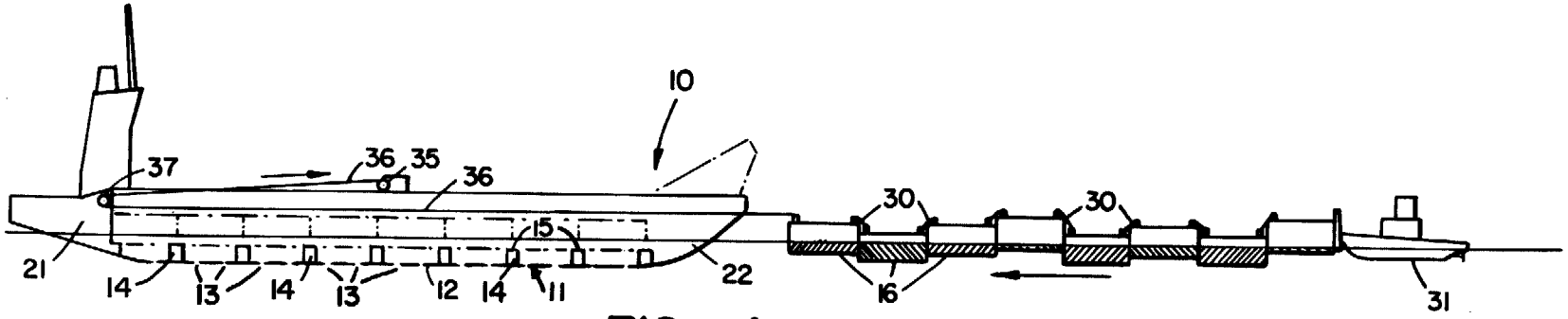
FIG. 1 is a schematic view in side elevation of a vessel embodying the principles of the invention and a series of barges or lighters previously aligned for loading into the vessel; the portion of the barges or lighters below the waterline are shaded. The barges or lighters are also shown, in broken lines, in their final, transporting position within the vessel.
Figure 3:
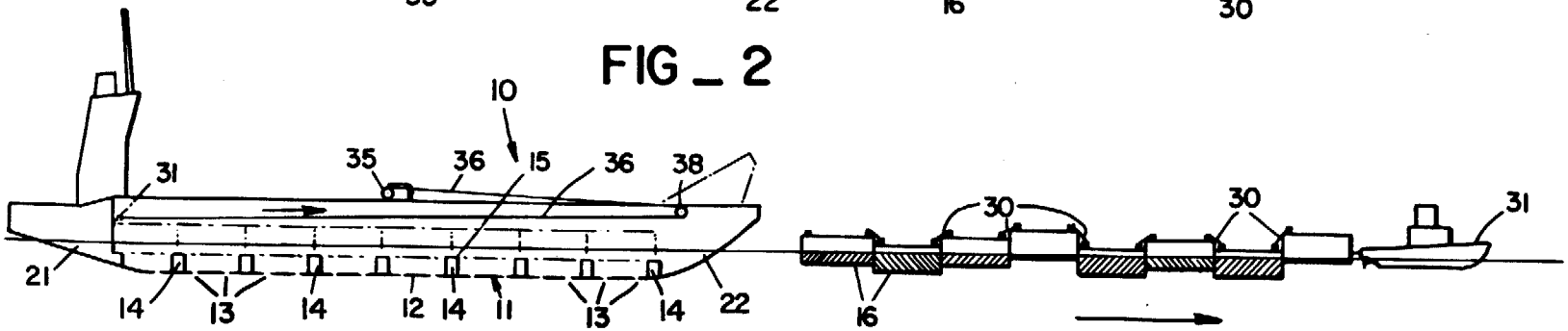
FIG. 3 is a view similar to FIG. 1, showing the barges or lighters just after the unloading operation.

As shown in FIGS. 1 and 3, a principal cargo for the vessel preferably comprises a series of containers 16, such as standardized covered lighters or barges, each of which is a standard member and each of which is outfitted with standard equipment. All the containers 16 are contemplated to be substantially identical in size and shape, and each has certain fittings, as shown in some of the drawings such as in FIGS. 9 and 10, which may include cylindrical projections 25 at their upper ends 24 with frustoconical terminal projections 26 extending above the projections 25. They also preferably have cylindrical recesses 27 at their bottoms 28 with frustoconical terminal sockets 29. These are availed of to lock the containers 16 securely in place during the voyage. Heretofore, they have been used mainly for stacking the containers 16 on board a large ship, but the containers 16 are not stacked in the hold of the present invention; they are all retained on the same level, and these same fittings 25, 26 and 27, 29 are employed for stabilization of the cargo. Other parts of these lighters or barges which are not essential to the present invention are not shown. They are well known in most cases, and if other types are devised they can be adapted to this vessel or the vessel can be adapted to them.

Figure 2:
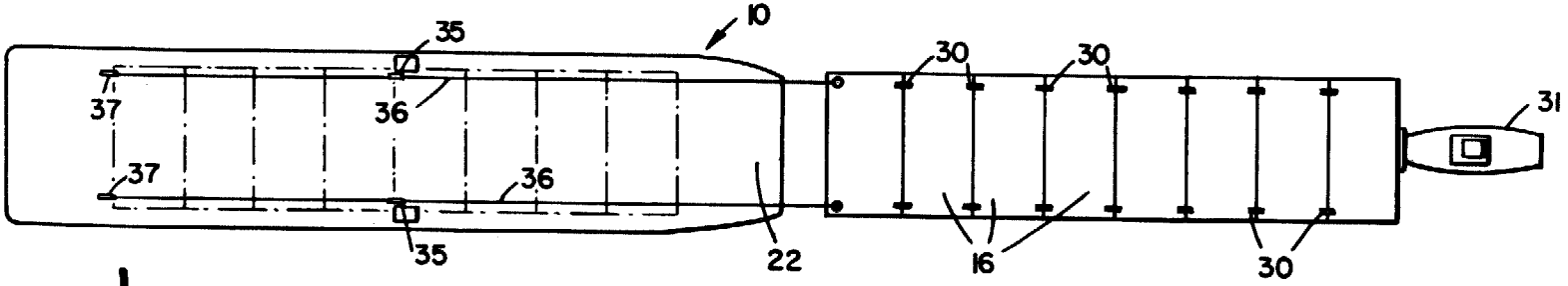
FIG. 2 is a schematic top plan view of the vessel and floating containers of FIG. 1.

In a vessel 10b, the barges or lighters 16 are typically floated in through the bow and out through the stern of the vessel in a train or tandem series. Where there is only one gate, it is used for passage both in and out. As shown in FIGS. 1–3, the containers 16 may be attached to each other by ropes or cables 30, employing anchoring or winching attachments that exist in such containers as they are already made, so that each container 16 is linked to a succeeding container 16. Tugboats 31 push or pull the trains. Normally, due to various degrees of loading and various cargo densities, the containers 16 will not all float at the same level. In order that they float at the same draft or water level, they would all have to be either empty or all loaded with exactly the same amount and density of cargo. So a random probability of drafts would be as shown in FIGS. 1 and 3, floating at different levels; some are heavy with their upper ends 24 practically at the water level, while others are light with their lower ends 28 nearly at the water level. The vessel 10 is designed to accommodate such differences, so that during barge handling operations there is sufficient space 32 between the bottom transverse hull girders 14 and the deck transverse girders 33, and that space is substantially twice that of the height of the containers 16.

Figure 19:
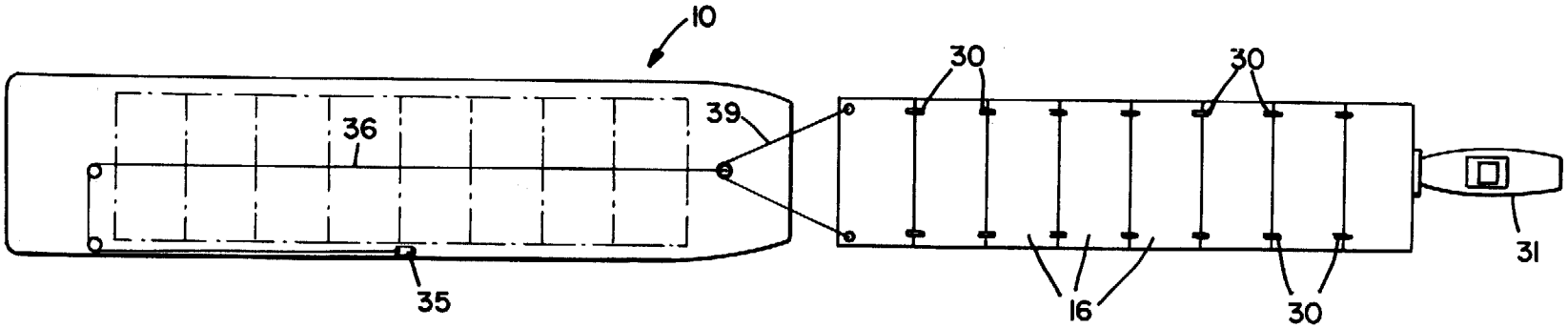
FIG. 19 is a diagrammatic plan view like FIG. 2 showing an alternate form of loading system employing a single winch.

When the containers 16 are towed or pushed up to the vessel 10, the bow gate 23 is opened so that the containers can be floated into the vessel, and when the containers 16 approach the vessel 10 closely, a pair of winches 35 on the ship 10 are attached by cables 36 to the foremost of the containers 16. The winches 35 are preferably located at about the center of the vessel 10. There are pulleys 37 near the stern which are used during loading and pulleys 38 near the bow 22 which are used during unloading. Thus, during loading the cables 36 from the winches 35 go over the stern pulleys 37, one on the port and one on the starboard side of the vessel 10, and then one is brought back to the bow 22 and through the gate 23 and attached to the foremost of the containers 16. Then the winches 35 are powered to pull the containers 16 into the hold 32; the tugboat 31, being disengaged, returns to port. Other types of loading or container-propelling means could be used, including a single winch 35 with a bridle 39 on the end of the line, as shown in FIG. 19.

Figure 9:
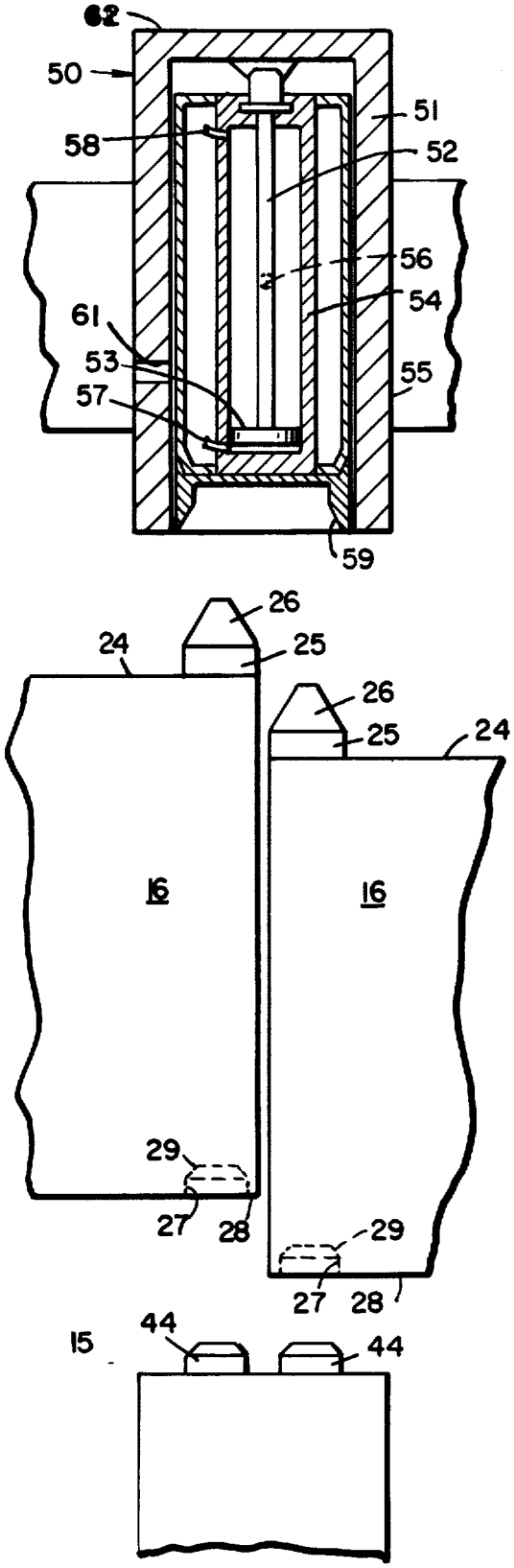
FIG. 9 is a fragmentary view in side elevation and partly in section of one of the hydraulic cylinders used in the securing device at adjacent corners of two barges or lighters, these two having different densities and shown floating at different levels.
Figure 10:
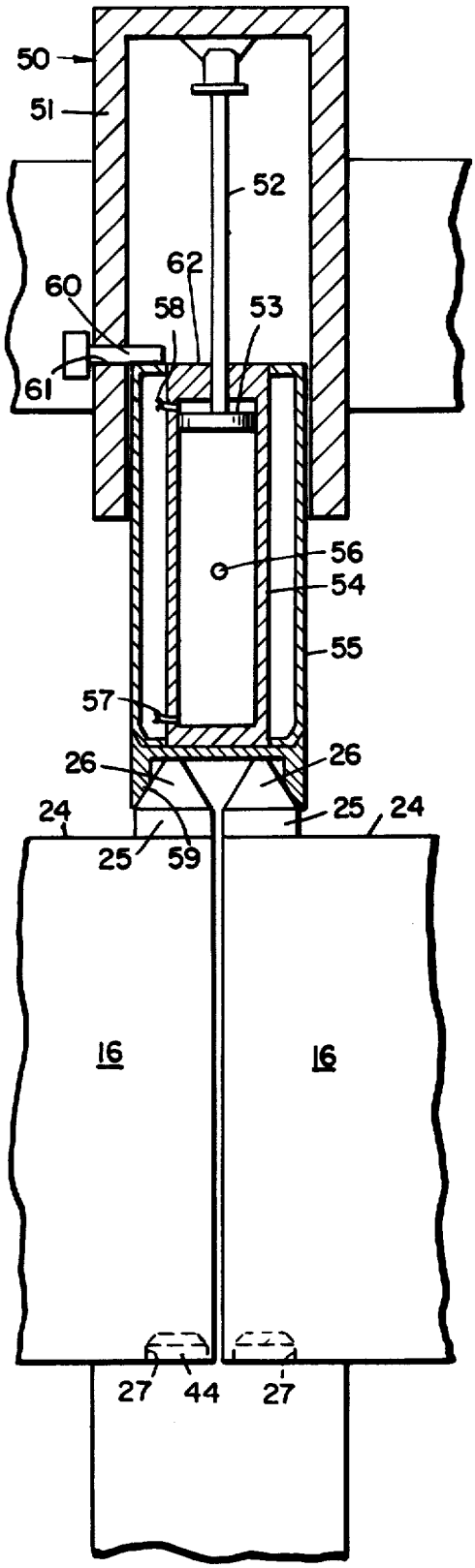
FIG. 10 is a view like FIG. 9 with the members in their final stabilized position, the hydraulic apparatus being fully extended and a mechanical safety lock pin set in place.

When all the lighters or barges 16 have been brought inside the hold 32 of the vessel 10, they are roughly positioned with respect thereto. The inside walls 40 of the buoyancy tanks 18 slope downward and inward, so that the buoyancy tanks 18 are narrower at their upper ends than at their lower ends, and along these side walls 40 are diagonal fender strips 41 of matting or elastomer which protect the buoyancy tanks 18 from damage from the barges and lighters. The buoyancy tanks may be deballasted by pumps 19 to lighten the vessel so as to lift the heaviest laden of the barges or lighters 16 on the cross girders 14 of the hull 11. The containers 16 are aligned during deballasting so that they will eventually seat on bottom projections 44 located on the griders 14 and enter the receptacles 27, 29 of the containers 16, there being one such receptacle at each corner, as shown in FIG. 9 or 10. The projections 44 each have cylindrical portions 45 ending in frustoconical portions 46.

Above the containers 16 and suspended from the deck 33 is a series of hydraulic (or pneumatic) devices 50, each of which comprises a stationary housing 51 secured to deck girders 33 to which is secured a stationary piston rod 52 and a stationary piston 53. A movable cylinder 54 is provided, and to this cylinder 54 a movable spud or housing member 55 is secured by a trunnion pin 56. Thus, when hydraulic or pneumatic fluid is sent by a port 57 into the space between the lower end of the piston 53 and the cylinder 54, the cylinder 54 is moved down and carries with it the outer spud 55. When the fluid is applied by a port 58 between the piston 53 and the upper end of the cylinder 54, the cylinder 54 is retracted upwardly. Each spud 55 of FIGS. 9 and 10 has a receptacle 59 suitable for engaging two, projections 25, 26.

Figure 27:
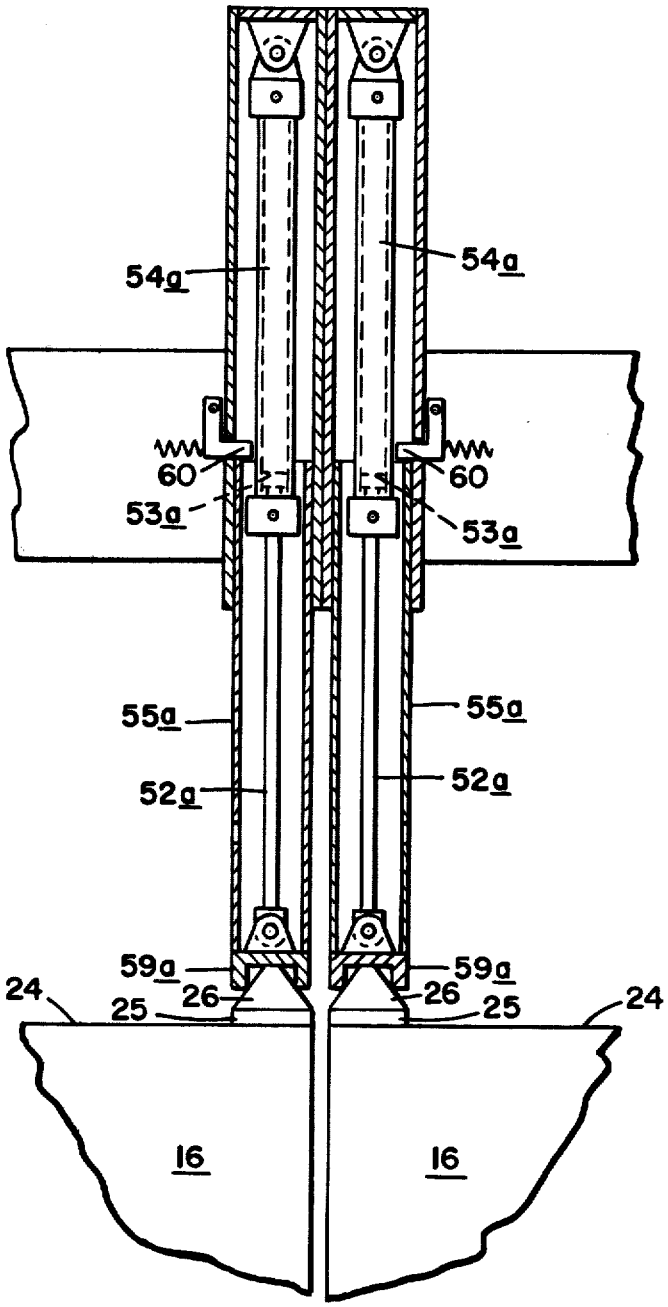
FIG. 27 is a view similar to FIG. 10 showing a modified form of hydraulic apparatus.

As shown in FIG. 27, each spud 55a unit may have a receptacle 59a which engages only one projection 25, 26, and this receptacle 59a is shown on a rod 52a of a movable piston 53a with this unit having a stationary cylinder 54a. Both types of spuds 55 and 55a have their advantages and disadvantages. Either type may be used in conjunction with a modulating control valve of a type well known so that all spuds move down at the same speed whether or not they have engaged a projection 25, 26 and are pushing down on a load.

Figure 28:
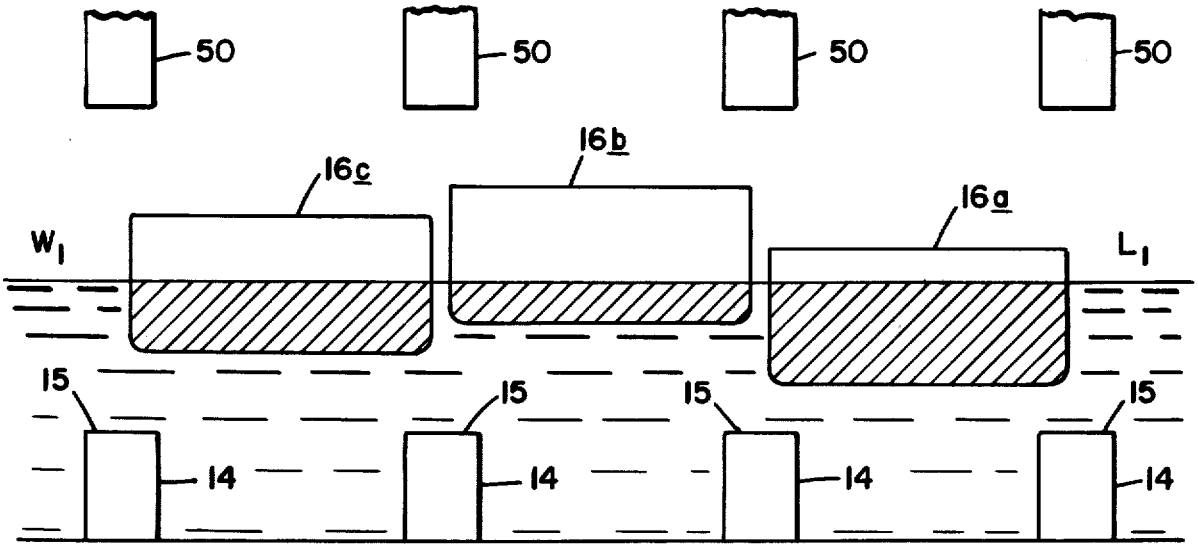
FIG. 28 is a diagrammatic fragmentary view of three barges in the hold before operation of the securing device, showing their individual waterlines.
Figure 29:
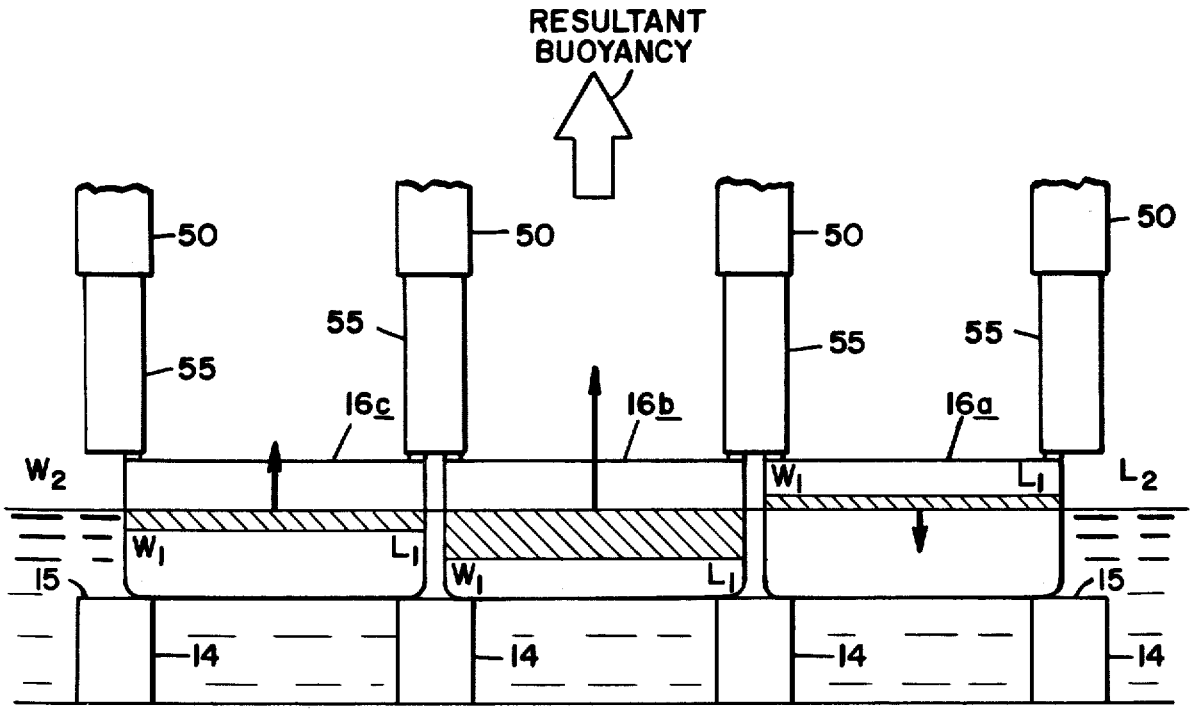
FIG. 29 is a view like FIG. 28 after operation of the securing device showing the buoyancy effects of the barges after securing and illustrating transfer of buoyancy according to this invention.

When the containers 16 are all engaged and pushed down to their lowermost position, they are secured in place, and there is a buoyancy transfer action which is novel. For example, as shown in FIG. 28, each container 16 has its own waterline and typically, some containers 16 have a higher water-line than others. When floating freely, all three containers 16a, 16b and 16c of FIG. 28 are buoyant, but the container 16a has the highest waterline or deepest draft, and the container 16b has the lowest waterline or lightest draft. When secured in place by the buoyancy transfer and securing means described, they appear as in FIG. 29; all held at the same level. Their initial waterlines $W_1L_1$ are shown as well as their present waterline $W_2L_2$ in FIG. 29. The shaped portions in FIG. 28 indicate the portions below the original waterline $W_1L_1$ while the shaped portions in FIG. 29 indicates the displacement of the original waterline $W_1L_1$ from the new water line $W_2L_2$. When the displacement is above the waterline $W_2L_2$ (as it is for the container 16a), then the net effect is that a proportion of the weight of the container (corresponding to the proportion of the shaded portion in FIG. 29 to the whole container) is weight borne by the hull 11. When the displacement is below the waterline $W_2L_2$ (as for the containers 16b and 16c), then the effect is to add upward buoyancy to the vessel 10—to transfer a buoyancy corresponding to the shaded portion of FIG. 29 from the containers 16b and 16c to the vessel 10 and thus to cause the buoyancy of the containers 16b and 16c to help buoy up the vessel 10 and help carry the load of the shaped portion of the container 16a.

Figure 20:
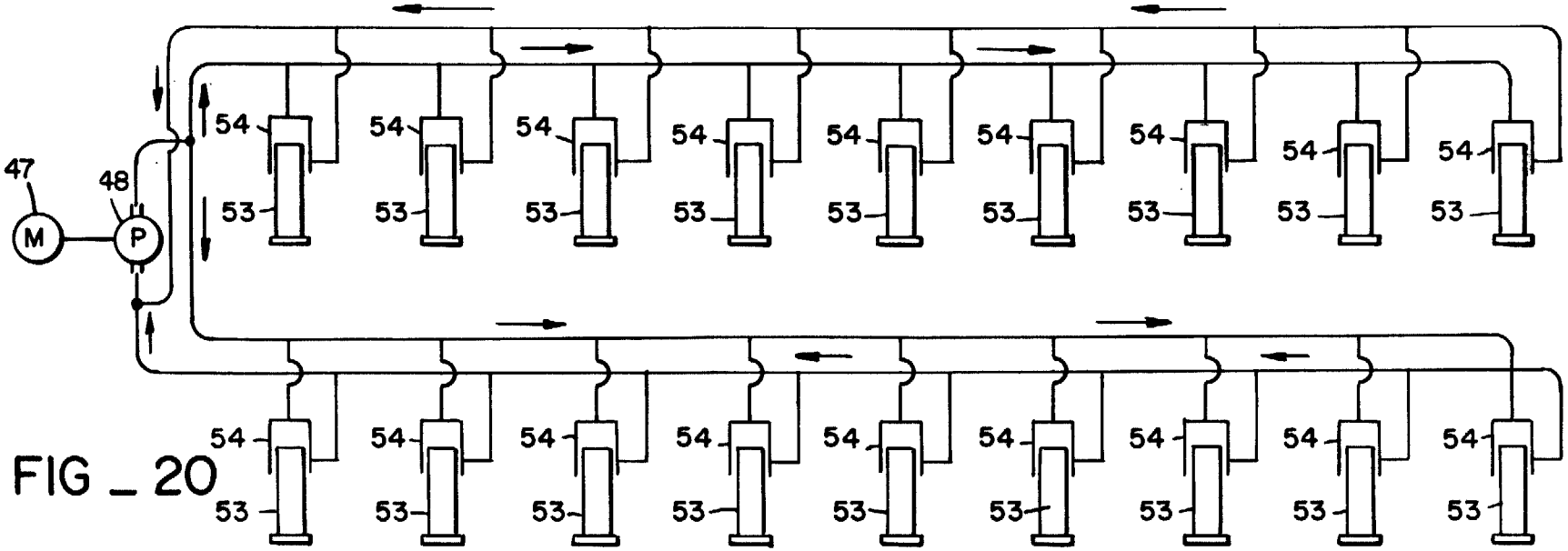
FIG. 20 is a diagram of an hydraulic circuit for operating all of the securing devices simultaneously.
Figure 21:
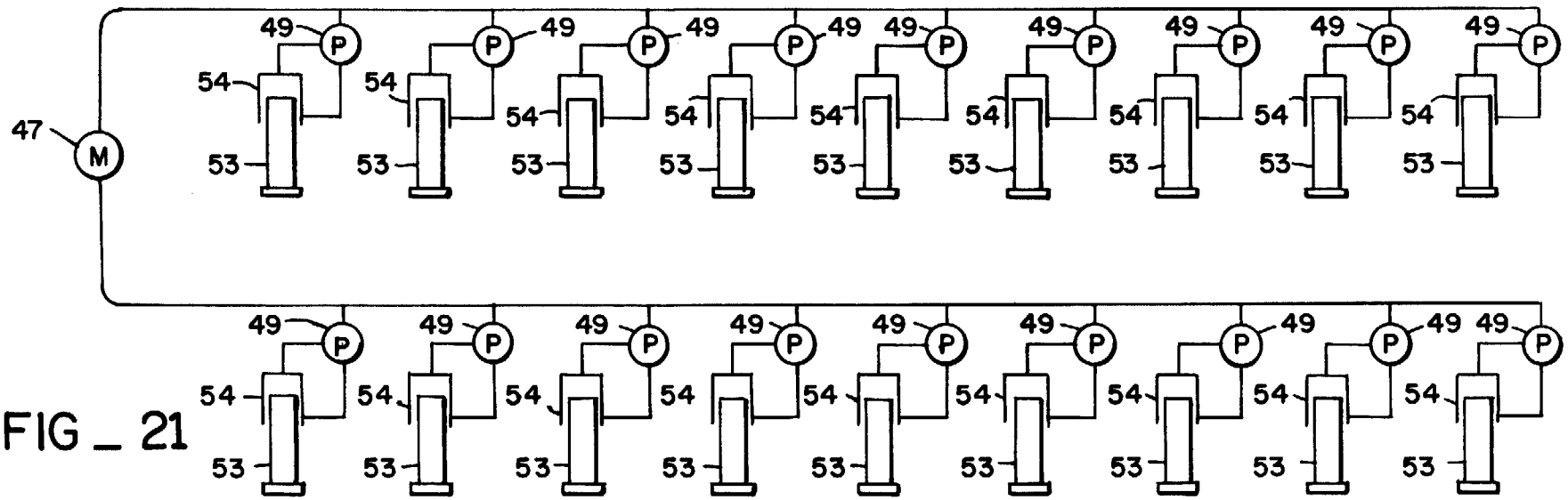
FIG. 21 is a diagram of an hydraulic circuit for operating each of the securing devices separately.

The devices 50 may be actuated independently of each other, as shown in FIG. 21, but for most situations they are linked together to a single control and operate simultaneously, as shown in FIG. 20. The cables 30 are left alone, becoming slack when the barges 16 are secured by the devices 50 in position for transit.

In the FIG. 20 form of the invention a single motor 47 and a single pump 48 are used, with the cylinders 54 in parallel with each other; in the FIG. 21 form of the invention the motor 47 may operate a whole series of pumps 49 in parallel with each other, with each pump 49 operating only one cylinder 54.

As shown in FIGS. 11–14, the vessel 10 may be constructed with the transverse girders 14 in the form of watertight box girders with top plates 70 and side plates 71 and 72 which are welded to the bottom plates 12. The openings 13, *which may be conduits, as shown in FIG. 12,* do not open into the girders 14, which are watertight voids to provide buoyancy at all times. The girders 14 are strengthened by perforate webs 73 and by angle irons 74 secured to plates 70, 71, and 72, the webs 73 having openings 75 through which the angle irons extend. The plates 70 are strengthened at the locations where the projections 44 are located, as by thickening and by diagonal members 76 going to angle irons 74. Lengthwise, between successive girders 14, the hull bottom 12 is strengthened by lengthwise-extending beams 77 such as T-shaped beams. The buoyancy tanks 18 may also be strengthened by perforate webs 78 and angle irons 79 secured to the plates providing the walls of the tanks 18.

The decks over the flooded hold may be hinged pontoons or removable pontoons handled by the vessel's cranes 80, of which there are usually two, located one on each side. A conventional mast and boom cargo handling system may also be employed.

When the lighters or barges 16 are inside the hold 32 of the vessel 10, then the fluid is applied to the lower ports 57 of all devices 50 and all the spuds 55 (or 55a) are lowered carefully in unison, to accommodate the alignment of the containers 16 automatically, so that each spud 55 engages first the projections 25, 26 of the more buoyant barge or lighter 16 and pushes it down, and then engages the projections 25, 26 of the less buoyant barge or lighter 16, eventually pushing the sockets 27, 29 of both of them against the bottom projections 44, so that the containers 16 are locked securely in place and cannot thereafter move during the voyage. (Similar action occurs with the spuds 55a, with the differences clearly apparent.) As a safety precaution a lock pin 60 is inserted through an opening 61 in the housing 51 to engage the upper end 62 of the spud 55 to prevent upward movement thereof. While this is being done, or after it has been done, the buoyancy tanks 18 are adjusted to give the proper waterline, trim, and list. Since there will always be water inside the hold 32 and since some of the containers 16 will be so heavy that they will rest directly on the hull girders 14, the total load of the vessel 10 is lightened by the lighter containers 16, which may be completely empty or may be considerably lighter and thereby, in effect, impart a negative load to the hull 11, counteracting to some extent the positive load of the filled and heavy barges or lighters 16. This transfer of buoyancy enables a sharing which is very effective.

Once all of the containers 16 are in place, or even at the same time, additional cargo 84 not of the floatable type may be taken on and loaded on deck as shown.

Figure 24:
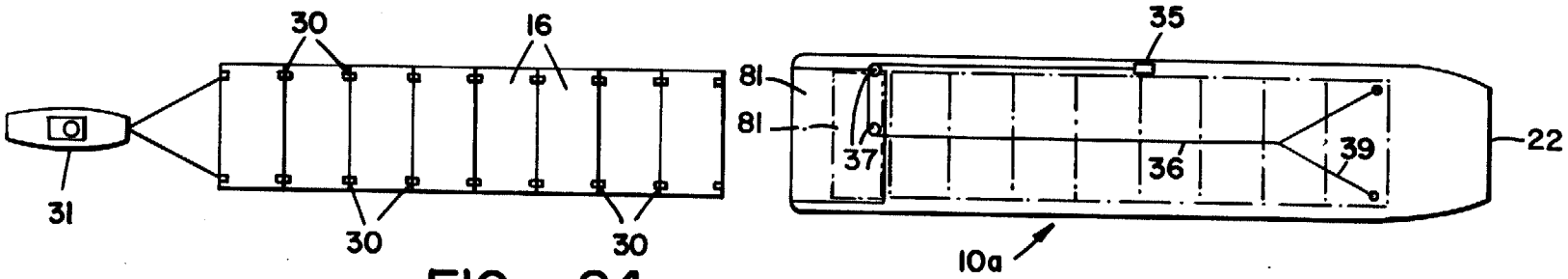
FIG. 24 is a view similar to FIG. 19 showing discharge aft through a stern gate.

When the ship 10 has reached its port of destination and anchors in protected waters, the pins 60 are pulled out, the lock spuds 55 are all released, and the vessel 10 is ballasted so that all the containers 16 float freely. Unloading operations may proceed as shown in FIG. 3, by opening the bow gate 22 and with the winch 35 then being attached over the forward pulley 38 and then to the [aforemost] *aftermost* container 16, and then the containers are pulled out through the bow in order, still locked together. Then the unloaded series of barges or lighters 16 may be push or pull-towed by a suitable tugboat 31 to cargo distribution points. Alternatively, unloading operations may proceed as shown in FIGS. 22 and 24, with the winch 35 attached to the after pulley 37 and then to the forwardmost container 16, pulling the containers out through the stern, all still locked together. With the vessel 10b having both a bow gate 63 and a stern gate 81, the loading and unloading proceed in the same direction, the first barge or container 16 to go in being the first to come out, a procedure especially useful when some containers 16 are to be unloaded at a first port of call and other containers picked up there, and other containers are delivered to other ports of call, whether still others are acquired at each port or not. For this purpose the containers are initially loaded in the order in which they are to be unloaded later. Thus at each port of call the devices 50 are released, as are pertinent cables 30, a few containers 16 may be moved out through the stern gate 81 for delivery to that port; then the remaining containers 16 are moved by the winch 38 closer to the stern, and finally containers 16 from that port are moved into the hold through the bow gate 63 and all containers again locked in place. Other practices may be followed in partial discharge and loading operations.

A typical vessel of this structure would have a displacement of about 10,000 tons, would be about 360 feet long, would have a beam of about 80 feet, and a draft of about 15 feet. The lock spuds would typically be about five feet in diameter or five feet square and 14 feet high. About eight barges or lighters would be accommodated, these typically being about 60 feet long by 30 feet wide by 14 feet high.

Figure 8:
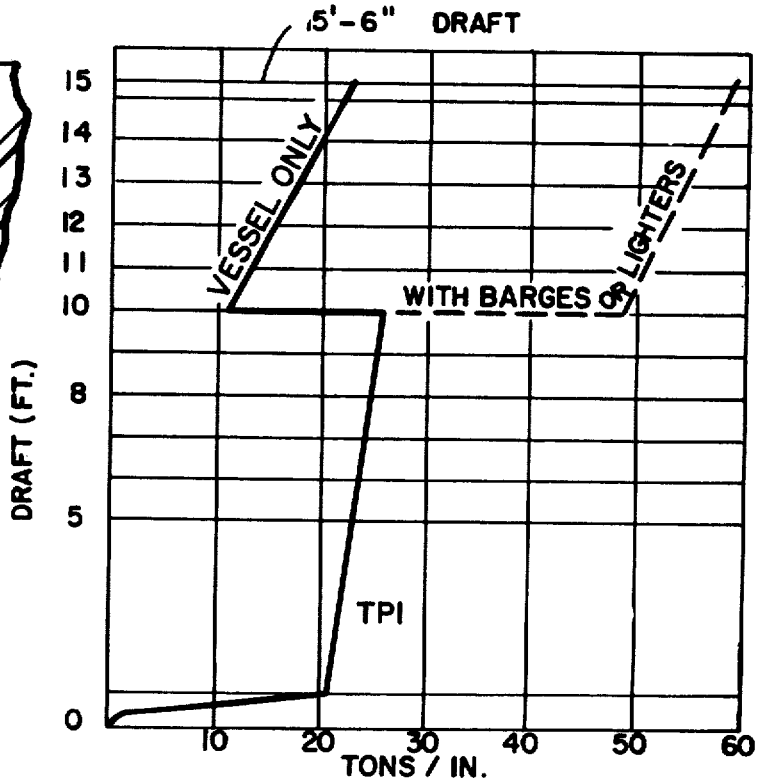
FIG. 8 is a graph of tons per inch immersion plotted against the draft in feet of the vessel, showing the effect of buoyancy on the vessel with and without barges or lighters stowed on board.

As FIG. 8 shows, the tons-per-inch immersion increases rapidly for the first foot of draft and then, bears a linear relationship up to a draft of about 10 feet, the level of the upper surface 15 of the transverse girders 14. At that level, the tons-per-inch immersion can vary widely, reducing to a low value with the ship empty or increasing rapidly if loaded with barges or lighters. with the ship empty at the draft of 10 feet, the tons-per-inch immersion rises linearly to a draft of 15 feet where it is at a value less than that at 10 feet. With the vessel 10 loaded at the draft of 10 feet, the tons-per-inch immersion rises linearly to its maximum value as the ship lowers in the water to its preferred operating draft of about 15½ feet. The curve shown in FIG. 8 illustrates the transfer of buoyancy concept of this invention in which the excess buoyancy of lighter floating cargoes, such as barges and lighters, is transferred to the vessel through locking spuds to assist in support of vessel and other heavier barges.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. A vessel for transport of a floating buoyant cargo such as barges, lighters, and pontoons, wherein said cargo is partially supported in the vessel by its own buoyancy, including in combination:

a hull having a bottom shell with rigid submarine cargo-supporting and hull-reinforcing structure, a bow, a stern, and side walls providing a series of buoyancy compartments, and a hollow enclosed interior including a cargo hold, said shell having openings communicating with said hold for free passage of water therethrough into and out from said hold at all times, so that said hold is always flooded, means for introducing and expelling water from said buoyancy compartments to adjust the draft, trim, and list of said vessel, gate means in said hull for opening to enable flotation loading and unloading of said floating cargo and for closing during transportation thereof, and securing means for releasably locking said cargo in place in said flooded hold against movement relative to said hull all during a voyage of said vessel, with a lower portion of said cargo engaging said submarine cargo-supporting structure, said securing means including means for engaging an upper portion of said cargo, whereby the water in the flooded hold enables the buoyancy of the cargo to support the cargo, at least in part.

2. The vessel of claim 1 having means for operating all said securing means simultaneously.

3. The vessel of claim 1 wherein said securing means comprises a series of hydraulically actuated locking spuds mounted to an upper part of said vessel which is rigidly connected to said hull for downward movement toward said cargo-supporting structure.

4. The vessel of the claim 3 wherein each of said locking spuds comprises a stationary piston and a movable cylinder.

5. The vessel of claim 4 having a single hydraulic fluid system for simultaneous operation of all spuds.

6. The vessel of claim 4 having a hydraulic fluid system for separate actuation of each of said spuds.

7. The vessel of claim 1 wherein said gate means comprises a bow gate having horizontal pivot means above waterline and opening upward.

8. The vessel of claim 1 wherein said gate means comprises a stern gate having horizontal pivot means above waterline and opening upward.

9. The vessel of claim 1 wherein said gate means comprises both a bow gate and a stern gate, each having horizontal pivot means above waterline and opening upward.

10. A vessel for transport of a floating buoyant cargo such as barges, lighters, and pontoons, wherein said cargo is partially supported in the vessel by its own buoyancy and the cargo is also secured to the vessel in such a way as to enable transfer to the vessel of a significant part of the buoyancy of the cargo all during the voyage, including in combination:

a hull having a bottom shell with rigid submarine cargo-supporting and hull-reinforcing structure, a bow, a stern, and side walls providing a series of buoyancy compartments, and a hollow interior including a cargo hold, said shell having openings communicating with said hold for free passage of water therethrough into and out from said hold at all times, so that said hold is always flooded, means for introducing and expelling water from said buoyancy compartments to adjust the draft, trim, and list of said vessel, gate means in said hull for opening to enable flotation loading and unloading of said floating cargo and for closing during transportation thereof, and buoyancy transfer and securing means for releasably locking said cargo in place in said flooded hold against movement relative to said hull all during a voyage of said vessel, with a lower portion of said cargo engaging said submarine cargo-supporting structure, said buoyancy transfer and securing means including means for engaging an upper portion of said cargo, whereby the water in the flooded hold enables the buoyancy of the cargo to support, at least in part, the cargo and that water cooperates with the buoyancy transfer and securing means to transfer part of the buoyancy of the cargo to said hull, to help to support the weight of said vessel.

11. The vessel of claim 10 wherein said cargo comprises a series of identical floating containers, each said container having an upper end with a vertical projection adjacent each corner and a lower end with a vertical recess adjacent to each corner, said buoyancy support and securing means comprising:

lower projections extending up vertically from said rigid submarine cargo-supporting structure for engagement in said recesses for aligning said containers, and a series of locking spuds for releasably locking said containers in place where their lower ends engage the lower projections from said submarine cargo-supporting structure, said spuds including means for engaging said upper end projections of each said container.

12. The vessel of claim 11 wherein said locking spuds comprise a stationary piston and a movable cylinder contained in said spud and secured to said spud by a central trunnion pin.

13. The vessel of claim 12 having a single fluid system for all said pistons and cylinders and providing for simultaneous operation of all said spuds.

14. The vessel of claim 12 having a hydraulic fluid system for separately actuating each of said spuds.

15. The vessel of claim 11 wherein each of said [puds] *spuds* except those as the extreme ends of the ship having vertical recesses for engaging the projections of two said containers.

16. The vessel of claim 11 having a single hydraulic fluid system for actuating all of the spuds simultaneously.

17. The vessel of claim 10 wherein said rigid submarine cargo-supporting and hull-reinforcing structure comprises a series of watertight box beams extending transversely of said hull, said hull bottom being imperforate at said box beams.

18. The vessel of claim 10 wherein said gate means comprises a bow gate having horizontal pivot means at all times above water level, said bow gate opening upwardly.

19. The vessel of claim 18 wherein said bow gate has a swash bulkhead spaced therefrom, said bulkhead being generally vertical and perforate to limit the degree of free water movement [with] *within* the hull.

20. The vessel of claim 10 wherein said gate means comprises a stern gate having horizontal pivot means at all times above water level, said stern gate opening upwardly.

21. The vessel of claim 20 wherein said stern gate carries propelling means for said vessel.

22. The vessel of claim 10 wherein said gate means comprises both a stern gate and a bow gate, each having horizontal pivot means at all times above water level, said gate opening upwardly.

23. A vessel for transport of a floating buoyant cargo comprising a plurality of floating units such as barges, lighters, and pontoons, wherein said cargo is partially supported in the vessel by its own buoyancy and the cargo is also secured to the vessel in such a way as to enable transfer to the vessel of a significant part of the buoyancy of the cargo all during the voyage, including in combination:

a hull having a bottom shell with rigid submarine cargo-supporting and hull-reinforcing structure, a bow, a stern, and side walls providing a series of buoyancy compartments, and a hollow interior including a cargo hold, said shell having openings communicating with said hold for free passage of water therethrough into and out from said hold at all times, so that said hold is always flooded, means for introducing and expelling water from said buoyancy compartments to adjust the draft, trim and list of said vessel, gate means in at least one end of said hull for opening to enable flotation loading and unloading of said floating cargo and for closing during transportation thereof, cargo-moving means on said hull for moving the floating units of said cargo into and out from said gate means and within said hold, buoyancy transfer and securing means for releasably locking said cargo in place in said flooded hold against movement relative to said hull all during a voyage of said vessel, with a lower portion of said cargo engaging said submarine cargo-supporting structure, said buoyancy transfer and securing means including means for engaging an upper portion of said cargo, whereby the water in the flooded hold enables part of the buoyancy of the cargo to support, at least in part, the cargo and that water cooperates with the buoyancy transfer and securing means to transfer part of the buoyancy of the cargo to said hull, to help to support the weight of said vessel, and whereby the buoyancy of lighter said units helps to support the heavier said units, due to such transfer.

24. The vessel of claim 23 wherein said cargo-moving means comprises a winch on each side of said vessel near the center thereof and two pulleys for each winch for alternate use, one adjacent each end of the vessel.

25. The vessel of claim 24 wherein said inner surfaces are provided with a series of diagonal fender pads.

26. The vessel of claim 23 wherein said cargo-moving means comprises a single winch on one side of said vessel near the center thereof, at least one pulley adjacent an end of the vessel, and a cable provided with a bifurcated bridle for attachment to a said container.

27. The vessel of claim 23 wherein the inner surfaces of said side walls slope downwardly and in toward the axis of the vessel.

28. The vessel of claim 23 wherein said gate means comprises two gates, one a stern gate and the other a bow gate.

29. The vessel of claim 28 wherein said stern gate is hinged upwardly and carries the vessel's propulsion machinery and propellers.

30. A vessel for transporting on a body of water various cargoes including a series of identical floating containers, such as barges and lighters, said containers having an upper end and a lower end, whether any particular container be full, empty, or partially loaded and whatever the average specific gravity of the load, including in combination:

a hull having a cargo-carrying hollow interior, a perforate bottom with rigid submarine supporting portions enabling passage of water therethrough into said hollow interior at all times, so that said interior is always flooded, said hollow interior being enclosed by a bow, a stern, and side walls providing a series of buoyancy chambers.

means for introducing and expelling water from said buoyancy chambers to adjust the draft, trim and list of said vessel, gate means at one end of said vessel for opening to enable flotation loading and unloading into the flooded interior of a string of said identical containers and for closing during transporation thereof, container propelling means for moving a said string of containers into and out from said hollow interior, through said gate means, and buoyancy transfer and securing means for releasably locking each said container in place at least partially under water in said flooded interior with its lower end engaging said submarine supporting portions, said securing means including means for engaging said upper end of each said container, whereby the flooded interior enables the excess buoyancy of the lighter of said containers to provide support for the load of the heavier said containers and for said vessel.

31. A vessel for transporting on a body of water various cargoes including a series of identical floating containers, such as barges and lighters, said containers having an upper end with a vertical projection adjacent each corner and a lower end with a vertical recess adjacent to each corner, whether any particular container be full, empty, or partially loaded and whatever the average specific gravity of the load, including in combination:

a hull having a cargo-carrying hollow interior, a perforate bottom with rigid submarine supporting portions enabling passage of water at all times therethrough into said hollow interior, so that said interior is always flooded, said hollow interior being enclosed by a bow, a stern, and side walls providing a series of buoyancy chambers, lower projections extending up vertically from said rigid submarine supporting portions for engagement in said recesses for aligning said containers, means for introducing and expelling water from said buoyancy chambers to adjust the draft, trim, and list of said vessel, gate means at one end of said vessel for opening to enable flotation loading and unloading of a string of said identical containers into the flooded interior and for closing during transportation thereof, container propelling means for moving a said string of containers into and out from said hollow interior, through said gate means, and a series of locking spuds for releasably locking said containers in place at least partially under water in said flooded interior, with their lower ends engaging the lower projections from said submarine supporting portions, said spuds including means for engaging said upper end projections of each said container, whereby the flooded interior enables the excess buoyancy of the lighter of said containers to provide support for the load of the heavier said containers and for the vessel itself.

32. A vessel for transporting on a body of water various cargoes including a series of identical floating containers, such as barges and lighters, said containers having an upper end with a vertical projection adjacent each corner and a lower end with a vertical recess adjacent to each corner, whether any particular container be full, empty, or partially loaded and whatever the average specific gravity of the load, including in combination:

a hull having a perforate bottom with rigid submarine supporting portions enabling passage of water therethrough, a bow, a stern, and side walls providing a series of buoyancy chambers, and a hollow interior, lower projections extending up vertically from said rigid submarine supporting portions for engagement in said recesses for aligning said containers, means for introducing and expelling water from said buoyancy chambers to adjust the draft, trim, and list of said vessel, gate means at one end of said vessel for opening to enable flotation loading and unloading of a string of said identical containers and for closing during transportation thereof, container propelling means for moving a said string of containers into and out from said hollow interior, through said gate means, and a series of locking spuds for releasably locking said containers in place where their lower ends engage the lower projections from said submarine supporting portions, said spuds including means for engaging said upper end projections of each said container, said locking spuds comprising a stationary piston and a movable cylinder contained in said spud and secured to said spud by a central trunnion pin, whereby the flooded interior enables the excess buoyancy of the lighter of said containers to provide support for the load of the heavier said containers.

33. A vessel for transporting on a body of water various cargoes including a series of identical floating containers, such as barges and lighters, said containers having an upper end with a vertical projection adjacent each corner and a lower end with a vertical recess adjacent to each corner, whether any particular container be full, empty, or partially loaded and whatever the average specific gravity of the load, including in combination:

a hull having a perforate bottom with rigid submarine supporting portions enabling passage of water therethrough, a bow, a stern, and side walls providing a series of buoyancy chambers, and a hollow interior, lower projections extending up vertically from said rigid submarine supporting portions for engagement in said recesses for aligning said containers, means for introducing and expelling water from said buoyancy chambers to adjust the draft, trim, and list of said vessel, gate means at one end of said vessel for opening to enable flotation loading and unloading of a string of said identical containers and for closing during transportation thereof, container propelling means for moving a said string of containers into and out from said hollow interior through said gate means, and a series of locking spuds for releasably locking said containers in place where their lower ends engage the lower projections from said submarine supporting portions, said spuds including means for engaging said upper end projections of each said container, each of said spuds except those at the extreme ends of the ship engaging the projections of two said containers, whereby the flooded interior enables the excess buoyancy of the lighter of said containers to provide support for the load of the heavier said containers.

34. A vessel for transporting on a body of water various cargoes includiing a series of identical floating containers, such as barges and lighters, said containers having an upper end with a vertical projection adjacent each corner and a lower end with a vertical recess adjacent to each corner, whether any particular container be full, empty, or partially loaded and whatever the average specific gravity of the load, including in combination:

a hull having a perforate bottom with rigid submarine supporting portions enabling passage of water therethrough, a bow, a stern, and side walls providing a series of buoyancy chambers, and a hollow interior, lower projections extending up vertically from said rigid submarine supporting portions for engagement in said recesses for aligning said containers, said rigid submarine supporting portions comprising a series of watertight box beams extending transversely of said hull and carrying said lower projections, said hull bottom being imperforate at said box beams, means for introducing and expelling water from said buoyancy chambers to adjust the draft, trim, and list of said vessel, gate means at one end of said vessel for opening to enable flotation loading and unloading of a string of said identical containers and for closing during transportation thereof, container propelling means for moving a said string of containers into and out from said hollow interior, through said gate means, and a series of locking spuds for releasably locking said containers in place where their lower ends engage the lower projections from said submarine supporting portions, said spuds including means for engaging said upper end projections of each said container, whereby the flooded interior enables the excess buoyancy of the ligher of said containers to provide support for the load of the heavier said containers.

*35. A vessel for transport of a floating buoyant cargo such as barges, lighters, and pontoons, wherein said cargo can be partially supported in the vessel by its own buoyancy, including in combination:*

*a hull having a bottom shell with rigid submarine cargo-supporting and hull-reinforcing structure, a bow, a stern, and side walls providing a series of buoyancy compartments, a hollow enclosed interior including a cargo hold, and conduit means communicating with said hold for passage of sea water into and out from said hold,*

*means for introducing and expelling water from said buoyancy compartments to adjust the draft, trim, and list of said vessel,*

*gate means in said hull for opening to enable flotation loading and unloading of said floating cargo and for closing during transportation thereof, and*

*securing means for releasably locking said cargo in place in said hold against movement relative to said hull all during a voyage of said vessel, with a lower portion of said cargo engaging said submarine cargo-supporting structure, said securing means including means for engaging an upper portion of said cargo,*

*whereby water in the flooded hold enables the buoyancy of the cargo to support the cargo, at least in part.*

*36. The vessel of claim 35 having means for operating all said securing means simultaneously.*

*37. The vessel of claim 35 wherein said securing means comprises a series of hydraulically actuated locking spuds mounted to an upper part of said vessel which is rigidly connected to said hull for downward movement toward said cargo-supporting structure.*

*38. The vessel of claim 37 wherein each of said locking spuds comprises a stationary piston and a movable cylinder.*

*39. The vessel of claim 38 having a single hydraulic fluid system for simultaneous operation of all spuds.*

*40. The vessel of claim 38 having a hydraulic fluid system for separate actuation of each of said spuds.*

*41. The vessel of claim 35 wherein said gate means comprises a bow gate having horizontal pivot means above waterline and opening upward.*

*42. The vessel of claim 35 wherein said gate means comprises a stern gate having horizontal pivot means above waterline and opening upward.*

*43. The vessel of claim 42 wherein said stern gate carries propelling means for said vessel.*

*44. The vessel of claim 35 wherein said gate means comprises both a bow gate and a stern gate, each having horizontal pivot means above waterline and opening upward.*

*45. A vessel for transport of a floating buoyant cargo comprising a plurality of floating units such as barges, lighters, and pontoons, wherein said cargo can be partially supported in the vessel by its own buoyancy and the cargo is also secured to the vessel in such a way as to enable transfer to the vessel of a significant part of the buoyancy of the cargo, including in combination:*

*a hull having a bottom shell with rigid submarine cargo-supporting and hull-reinforcing structure, a bow, a stern, and side walls providing a series of buoyancy compartments, a hollow interior including a cargo hold, conduit means communicating with said hold for passage of sea water into and out from said hold,*

*means for introducing and expelling water from said buoyancy compartments to adjust the draft, trim, and list of said vessel,*

*gate means in at least one end of said hull for opening to enable flotation loading and unloading of said floating cargo and for closing during transportation thereof,*

*cargo-moving means on said hull for moving the floating units of said cargo into and out from said gate means and within said hold,*

*buoyancy transfer and securing means for releasably locking said cargo in place in said hold against movement relative to said hull all during a voyage of said vessel, with a lower portion of said cargo engaging said submarine cargo-supporting structure, said buoyancy transfer and securing means including means for engaging an upper portion of said cargo,*

*whereby water in the flooded hold enables part of the buoyancy of the cargo to support, at least in part, the cargo and that water cooperates with the buoyancy transfer and securing means to transfer part of the buoyancy of the cargo to said hull, to help to support the weight of said vessel, and whereby the buoyancy of lighter said units helps to support the heavier said units, due to such transfer.*

*46. The vessel of claim 45 wherein said cargo-moving means comprises a winch on each side of said vessel near the center thereof and two pulleys for each winch for alternate use, one adjacent each end of the vessel.*

*47. The vessel of claim 45 wherein said cargo-moving means comprises a single winch on one side of said vessel near the center thereof, at least one pulley adjacent an end of the vessel, and a cable provided with a bifurcated bridle for attachment to a said container.*

*48. The vessel of claim 45 wherein the inner surfaces of said side walls slope downwardly and in toward the axis of the vessel.*

*49. The vessel of claim 45 wherein said gate means comprises two gates, one a stern gate and the other a bow gate.*

*50. The vessel of claim 45 wherein said stern gate is hinged upwardly and carries the vessel's propulsion machinery and propellers.*

*51. A vessel for transport of a floating buoyant cargo such as barges, lighters, and pontoons, wherein said cargo can be partially supported in the vessel by its own buoyancy and the cargo is also secured to the vessel in such a way as to enable transfer to the vessel of a significant part of the buoyancy of the cargo, including in combination:*

*a hull having a bottom shell with rigid submarine cargo-supporting and hull-reinforcing structure, a bow, a stern, and side walls providing a series of buoyancy compartments, a hollow interior including a cargo hold, and conduit means communicating with said hold for passage of sea water into and out from said hold,*

*means for introducing and expelling water from said buoyancy compartments to adjust the draft, trim, and list of said vessel,*

*gate means in said hull for opening to enable flotation loading and unloading of said floating cargo and for closing during transportation thereof, and*

*buoyancy transfer and securing means for releasably locking said cargo in place in said hold against movement relative to said hull all during a voyage of said vessel, with a lower portion of said cargo engaging said submarine cargo-supporting structure, said buoyancy transfer and securing means including means for engaging an upper portion of said cargo,*

*whereby water in the flooded hold enables the buoyancy of the cargo to support, at least in part, the cargo and that water cooperates with the buoyancy transfer and securing means to transfer part of the buoyancy of the cargo to said hull, to help to support the weight of said vessel.*

* * * * *

UNITED STATES PATENT AND TRADEMARK OFFICE

CERTIFICATE OF CORRECTION

PATENT NO. : Re. 30,040

DATED : July 3, 1979

INVENTOR(S) : William E. Kirby and David J. Seymour

It is certified that error appears in the above-identified patent and that said Letters Patent are hereby corrected as shown below:

Left-hand column of first page, item [63], "415,968" should read --413,968--.
Column 2, line 23, "are different" should read --are of different--.
Column 4, line 47, "sheel 12" should read --shell 12--.
Column 7, line 42, "shaped" should read --shaded--.
line 43, "shaped" should read --shaded--.
line 58, "shaped" should read --shaded--.
Column 9, line 40, "with" should read --With--.
Column 10, line 29, before "claim" delete "the".
Column 11, line 39, "as" should read --at--.
line 40, "having" should read --have--.

Signed and Sealed this

*Thirteenth* Day of *November 1979*

[SEAL]

*Attest:*

RUTH C. MASON
*Attesting Officer*

LUTRELLE F. PARKER
*Acting Commissioner of Patents and Trademarks*